US012332029B1

(12) United States Patent
Bowersock

(10) Patent No.: US 12,332,029 B1
(45) Date of Patent: Jun. 17, 2025

(54) WEARABLE PERSONAL DEFENSE DEVICE

(71) Applicant: Kristi Elise Bowersock, Newark, OH (US)

(72) Inventor: Kristi Elise Bowersock, Newark, OH (US)

( * ) Notice: Subject to any disclaimer, the term of this patent is extended or adjusted under 35 U.S.C. 154(b) by 0 days.

(21) Appl. No.: 18/787,128

(22) Filed: Jul. 29, 2024

(51) Int. Cl.
*F41H 9/10* (2006.01)
*B05B 9/08* (2006.01)

(52) U.S. Cl.
CPC ............. *F41H 9/10* (2013.01); *B05B 9/0805* (2013.01)

(58) Field of Classification Search
CPC ................................ F41H 9/10; B05B 9/0805
See application file for complete search history.

(56) References Cited

U.S. PATENT DOCUMENTS 4,058,237 A * 11/1977 Luke ......................... F41H 9/10 222/394
5,088,624 A * 2/1992 Hackett ................ B65D 83/386 222/509
6,123,228 A * 9/2000 Hippensteel .............. F41H 9/10 222/402.11
6,540,107 B1 * 4/2003 Admony .............. A44C 9/0053 222/78
9,386,438 B2 7/2016 Hymowitz
9,615,235 B2 4/2017 Scully et al.
9,658,604 B2 * 5/2017 Nagahama ............. G04R 60/10
9,922,537 B2 3/2018 Shah et al.
10,254,077 B2 4/2019 Crandall
12,101,883 B2 * 9/2024 Kim ......................... H05K 9/00
2006/0201964 A1 * 9/2006 DiPerna ............... H04B 1/3888 455/575.1
2012/0007735 A1 1/2012 Rhyins
2013/0016449 A1 * 1/2013 Crandall ............. F41H 13/0025 89/36.01
2016/0033238 A1 * 2/2016 Cooper .............. A41D 19/0031 239/375
2016/0349018 A1 * 12/2016 Gorinas ............... B65D 83/384
2017/0134560 A1 * 5/2017 Barnes .................. H04W 4/023
2019/0109932 A1 * 4/2019 Higgins ................. H04M 11/04
2020/0363164 A1 * 11/2020 Jimenez ................... G08B 3/10
2022/0252368 A1 * 8/2022 Dugo .................. F41H 13/0087
2024/0230282 A1 * 7/2024 Nash .................... G08B 15/004

FOREIGN PATENT DOCUMENTS

WO 2013/050763 A1 4/2013

* cited by examiner

*Primary Examiner* — Joshua E Freeman
(74) *Attorney, Agent, or Firm* — Jason H. Foster; Kremblas & Foster

(57) ABSTRACT

The present invention provides a personal defense device that is suitable for use by untrained and/or handicapped individuals when attacked. The device may be used by law enforcement personnel with a reduced chance of accidental discharge of a firearm. A strap is provided that fits around the wrist or another limb of the wearer. A controller is mounted to the main body along with an actuator and a pressurized gas reservoir. A housing is mounted to the main body to protect the components and may be removable. The device may be motion activated by an accelerometer connected to a circuit or other computer that recognizes a preprogrammed set of movements. The device may be voice activated or physically triggered by the user. The controller may provide at least one data function such as time stamping, geolocation, emergency texting, cell service, web access and Bluetooth compatibility.

13 Claims, 5 Drawing Sheets

WEARABLE PERSONAL DEFENSE DEVICE

BACKGROUND OF THE INVENTION

The invention relates generally to security devices, and more particularly to items for personal defense that may be worn on the body.

Large numbers of gas dispensers for pepper spray are available. However these are generally stored in a holster, pocket or purse and are not quickly available for personal defense. Law enforcement typically carry gas dispensers in a holster opposite their firearm. There have been several cases of accidental firearm discharge by law enforcement officers reaching for their holstered firearm when a gas dispenser was intended.

Typically, self-defense devices are inconvenient and require locating the device and subsequently activating the device. While well-trained users may be able to perform these tasks while under stress or under physical threat, a new and easily deployed device is desired.

SUMMARY OF THE INVENTION

Disclosed herein is a wearable personal defense device. Typically, the present invention is worn on the wrist or a limb so that it may be conveniently used in an emergency. The wrist-worn defense device is convenient when exercising and it is available on short notice when the wearer is attacked. The wrist-worn device includes at least a strap, a main body, a gas cartridge, an activator, and a gas dispenser. The wrist-worn device may be useful for civilian and law enforcement use.

Disclosed herein is a wearable personal defense device suitable for use by untrained and/or handicapped individuals when attacked. The device of the present invention may also be used by law enforcement personnel with a reduced chance of accidental discharge of their firearm due to the similarity between the grip of a firearm and the grip of currently available non-lethal defense devices. In order to provide an easily usable defense device a strap is provided that may fit around the wrist or the residual limb of an amputee or person born without a full appendage.

A band housing is mounted to the strap with a main body, a controller within the main body, an actuator, and a pressurized gas reservoir, in the form of a cartridge. The device may be motion-activated by an accelerometer connected to a circuit recognizing a preprogrammed set of movements, it may be programmed to be voice activated, and/or it may be physically triggered by the user, such as by manually pressing a button. The controller may provide at least one data function such as time stamping, geolocation, emergency texting, cell service, web access and Bluetooth compatibility. The wearable personal defense device of the present invention enables securing the personal device to the body via a wearable strap, such as a wrist strap.

Advantages that arise from the invention include a quicker response time, particularly for law enforcement/military, due to the location on a limb rather than in a belt or pack. The apparatus, when worn on the wrist, is ready for use and in sight at all times, with no risk of being confused for another weapon or defense item. Furthermore, officers are instructed in risk escalation, which includes the extension of arms toward a target. The structure described herein locates the apparatus directly between the officer and the target, permitting constant visualization by the officer and manual deployment when needed, while still leaving the hands free to engage in defensive tactics and escapes. Voice activation, as explained herein, permits close to instant activation.

Because the apparatus is lightweight and as comfortable to wear as any watch, wearers are not asked to engage a different form of wearable item for their defense. And because it may be in a form that is fashionable and stylish, users are also more likely to wear it if they do not wish to appear to be in a "defensive" posture, even though they are. Another advantage is that the apparatus is waterproof/water resistant, thereby making it practical to wear at all times.

In some embodiments, the cartridge that contains the defensive material, such as pepper spray, may also or alternatively contain an ultraviolet (UV) dye that cannot be washed off and remains in place for identification of the assailant. Still further, cartridges that contain water instead of pepper spray may be available in order for the wearer to practice using the apparatus without the use of pepper spray. The apparatus may also include a light-emitting diode (LED) or other light source to enhance visualization of assailants and/or surroundings.

In some embodiments, when the apparatus is deployed (i.e., the pepper spray is ejected from the cartridge), the apparatus communicates to a nearby, connected smartphone to send communications to other locations. Alternatively, or in addition, the apparatus uses components within the main body to communicate information to other locations. In either case, it is contemplated that text messages, prerecorded voice calls, GPS location data and other such information may be communicated to pre-selected phone numbers, and/or to 911 and/or to other emergency authorities.

Figure 1A:
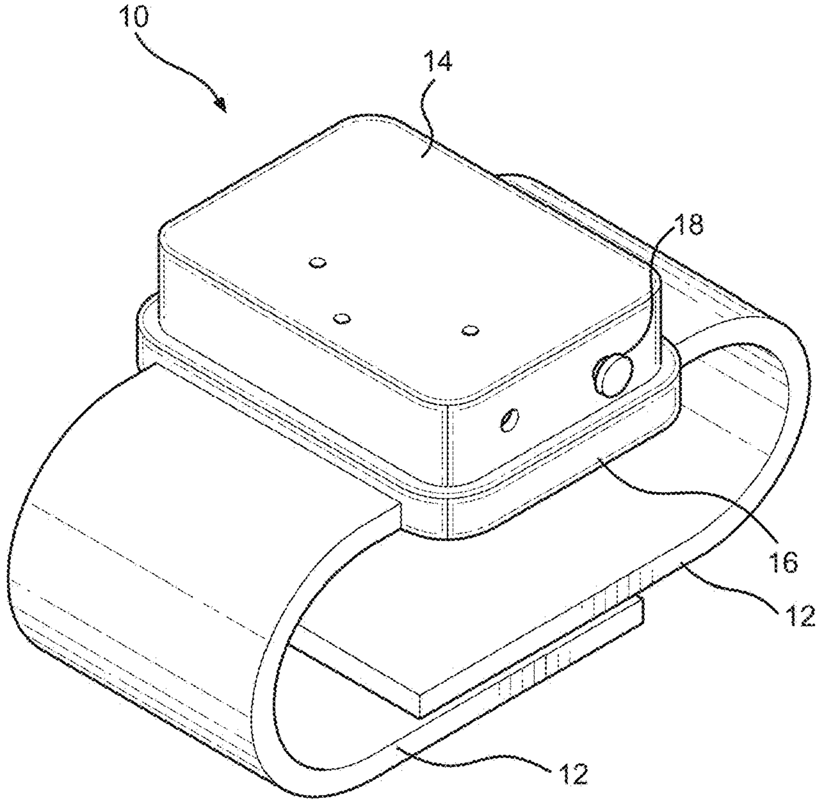
FIG. 1A is a top left perspective view illustrating the self-defense device of the present invention with the main body present.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

FIG. 1A shows an embodiment of a wearable personal defense apparatus 10 of the present invention. The apparatus 10 includes a strap 12, a housing 14, a main body 16, and an actuation button 18. The main body 16 is a frame structure to which the operational components of the apparatus 10 attach. The main body 16 may be made of aluminum, fiber-reinforced polymer, or any material that provides a strong structure to which other components may attach.

The strap 12 attaches to opposite ends of the main body 16, and although the strap 12 may be deliberately removed from the main body 16 for replacement or other reasons, the strap 12 is preferably not detachable unintentionally from the main body 16. The strap 12 may be removably attached to the main body 16 in any manner by which conventional watchbands are removably attached to a conventional watch. The strap 12 may be a band or other structure that extends around a limb, such as the wrist, thigh, or any other limb, of a person wearing the apparatus 10. In a preferred embodiment, the strap 12 attaches to the main body 16 in a manner that permits the main body to either rotate after attachment to suit the wearer's preference of orientation, or the strap 12 may attach at one or more positions on the main body 16. In the second option, this permits the wearer to attach the strap 12 at a position on the main body 16 that orients the apparatus 10 as desired.

Figure 1B:
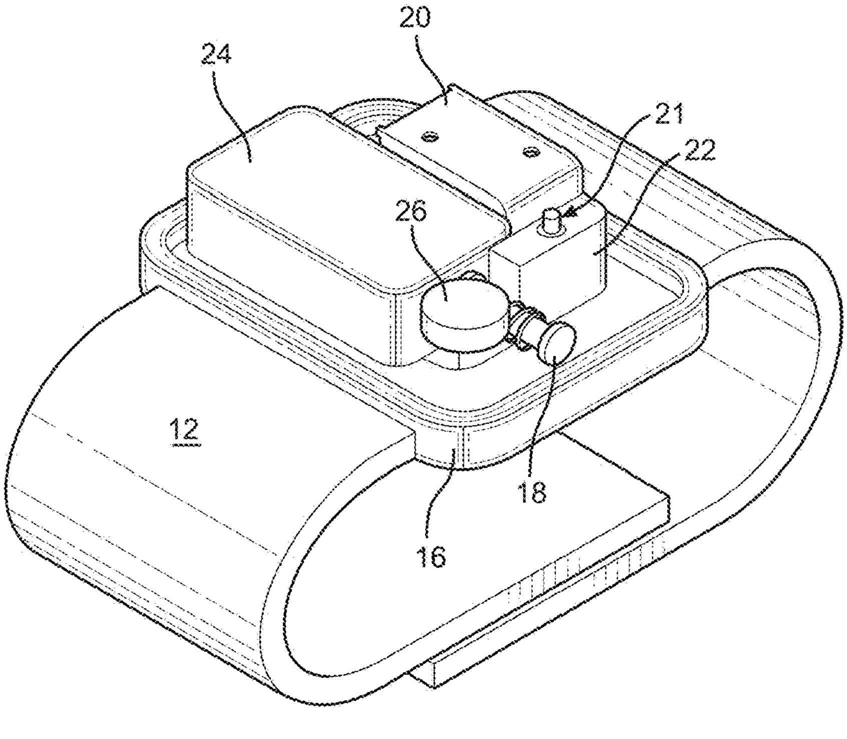
FIG. 1B is a top left perspective view illustrating the self-defense device of the present invention with the main body omitted.

The housing 14 is a cover that protects the components mounted on the main body 16 as shown in FIG. 1B, and may be made of aluminum, fiber-reinforced polymer, or any material that provides a protective structure over the components on the main body 16. The housing 14 is preferably removably attachable to the main body 16 to protect the contents thereof. For example, a circumferential rib may extend radially inwardly from the housing 14, and may be inserted into a circumferential groove 28 on the main body 16 (see FIG. 3) to maintain the housing 14 in place on the main body 16. The housing 14 is removable from the main body 16 to allow for maintenance and reloading of the apparatus 10. As can be seen, a groove 28 on the exterior of the main body 16 receives a detent on the interior of the housing 14.

The wearable personal defense apparatus 10 is shown in FIG. 1B with the housing 14 omitted to enable viewing of the contents thereof. The main body 16 holds a cartridge 24, which is preferably a pressure vessel that contains pepper spray or some other repellant material under pressure, or in a form that may react to generate pressure that can eject a repellant. The cartridge 24 may be flat, cylindrical or any desired shape, but is shown with a parallelepiped shape in order to show where it may be placed in a modern, wrist-worn structure. The cartridge 24 is preferably hollow, and it is contemplated that the cartridge 24 may have sidewalls that contain solid, liquid or semi-liquid components that react or otherwise generate pressure sufficient to eject a non-lethal liquid or gas repellant from the cartridge 24. Pressurized pepper spray is the desired contents of the cartridge 24, but any non-lethal (to humans and animals) repellant may be an acceptable substitute.

The cartridge 24 preferably has a localized area that is preferentially fractured (e.g., a frangible insert structure 25') to form an opening out of which the contents of the cartridge 24 are ejected. Thus, upon fracturing the frangible structure 25', the pepper spray is ejected from the cartridge 24 due to the pressure through the opening left behind after fracturing the frangible structure 25'. The cartridge 24 is not necessarily refillable, although this is contemplated, but is instead preferably readily removed from the main body 16 and replaced with an identical, factory-filled cartridge.

An actuator, such as the button 18 and the micro-solenoid 20, may be drivingly linked to the cartridge 24 to displace the cartridge 24 toward an orifice 25 through the housing 14 that aligns with the frangible structure 25'. Thus, when the cartridge 24 is displaced in this manner, an opening is formed at the orifice 25 so the pepper spray is ejected through the orifice 25 in a stream. There are many contemplated actuators, all of which displace the cartridge 24 to result in the pepper spray being ejected through the orifice 25.

One type of actuator is a micro-solenoid 20 that displaces a lever 22, which pivots about an axle 21, to displace the pressurized gas cartridge 24 towards the orifice 25 in the main body 16. Alternatively, the spring-loaded button 18 may be depressed manually by the user, using any body part or any solid structure nearby, to displace the pressurized gas cartridge 24 towards the orifice 25 in the main body 16. The button 18 is spring-loaded and extends through the opening 30 in the main body wall (see FIG. 1A) opposite the orifice 25. However the cartridge 24 is displaced, by the micro-solenoid 20, manually by the button 18, or by any other actuator, the movement of the cartridge 24 activates the pressurized gas to discharge out of the cartridge and through the orifice 25. This may be by the frangible structure 25' being fractured by impacting a pointed object in the cartridge's 24 path to the opposite end of the main body 16, or by some other means. In FIG. 3B, the pointed object 24' is in the path of the cartridge 24. When the cartridge 24 is displaced far enough toward the orifice 25, the frangible structure 25', which is the area around the end of the cartridge 24, impacts the pointed object 24' and breaks. This causes the release of the gas inside the cartridge 24 through a passage through the pointed object 24' and through the orifice 25.

A motherboard, computer or integrated circuit (IC) is preferably included, either on the apparatus 10 or connected thereto, such as with a wirelessly connected smart phone, to detect triggers for activation, such as voice-activation or based upon accelerometer inputs. The computer, whether onboard the main body 16 or in a connected smartphone, may also provide emergency texting of a predetermined message, cell service communication and web access and/or Bluetooth connection to other devices, along with recording and/or transmitting a time stamp and/or geolocation of the location of discharging the pepper spray. Voice or vibration alarms may be included to remind the user that the device remains active or has been deactivated. An LED or other light source may be included in the main body to permit assistance in low light conditions. The main body 16 may be waterproof and shock proof to be all-weather and exercise/assault capable. The main body 16 may also be rotatable relative to the strap 12 to fit the preference of amputees.

The micro-solenoid 20 may be actuated electronically, such as by an electrical signal, to function as described herein. A computer (not shown in the embodiment of FIG. 1A through FIG. 5), such as an integrated circuit (IC), may send an electrical signal to actuate the micro-solenoid 20.

Figure 2:
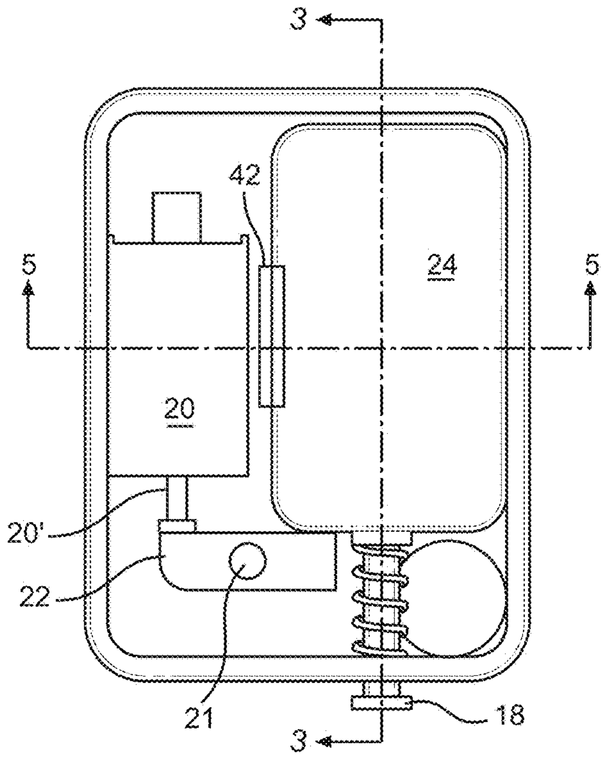
FIG. 2 is a top view illustrating the self-defense device of the present invention shown in FIG. 1B with the strap omitted.

When the solenoid 20 is actuated, the pin 20' is extended (downwardly in the orientation of FIG. 2), and the lever 22 pivots counterclockwise in the orientation of FIG. 2 about the axle 21. This action displaces the cartridge 24 upwardly in the orientation of FIG. 2, thereby causing the pressurized gas in the cartridge 24 to be ejected. When the button 18 is manually depressed, such as by a finger, elbow, chin, or any solid structure, the cartridge 24 is displaced upwardly in the orientation of FIG. 2 thereby causing the pressurized gas in the cartridge 24 to be ejected.

The computer connected to the solenoid 20 may actuate the solenoid 20 under various circumstances that the computer is programmed to detect. For example, if an accelerometer (not visible and optionally on a separate, connected device, such as a smartphone) detects a pre-programmed set of parameters indicating that the user wearing the apparatus 10 has been assaulted, the solenoid 20 may be actuated. Alternatively, a voice-activation function may be programmed into the computer, so that the user's vocalizing/speaking the word "help" or any other word or combination of words, or any distressed sound, such as a scream, causes the computer to actuate the solenoid 20. Any set of circumstances physically detectable by an accelerometer and/or detected by the computer as spoken words or other oral utterances may be programmed to actuate the solenoid 20, even if the accelerometer and/or voice activation apparatus/software are on a remotely connected device, such as a smartphone.

It is contemplated that there may be levels of "readiness" the computer may be programmed to be placed in. In one example, the computer may always be receiving signals from the accelerometer and the microphone to detect whether the solenoid 20 should be actuated. This can be referred to as "normal" status. In an escalated status, referred to as "armed," the computer may more readily actuate the solenoid 20. Armed status may be initiated by voice activation, such as by the wearer speaking a predetermined word or set of words, such as "My Defender, arm yourself" or other pre-programmed words. When in armed status, the computer is at a state in which the algorithm the computer uses to determine that the solenoid 20 should be actuated makes actuation more likely under the same conditions as would be actuated when in normal status. Armed status is ordinarily when the wearer is in a situation in which he or she detects that an attack is more probable. Thus, when the computer is in armed status, it is more likely to actuate the solenoid 20 under a given set of circumstances than in normal status.

Similarly, it is contemplated that a speaker (not shown) in the apparatus 10 produces sounds that communicate to the wearer, and anyone nearby, that the apparatus 10 is armed. This may be a recording in a local language equivalent to the statement, "My Defender is armed" or something similar. Alternatively, the sound may be a siren, short beep or other pre-programmed sound. Such a sound may have a preventative effect on a nearby attacker, causing him or her to reconsider attacking the wearer of the apparatus 10. Furthermore, such a sound confirms to the wearer that the apparatus 10 is the state of readiness desired. Thus, these confirmation sounds serve as a safety feature to ensure readiness, and they decrease the probability of a false activation. It is contemplated that, after being in armed state for a long period of time, the apparatus 10 may vibrate or produce an audible signal to remind the wearer that the apparatus is in the armed state. This is in case the wearer has forgotten, and should de-escalate the status back to normal.

A compact vibration motor 26 may also be included in the main body 16, in order to provide the function of vibrating, upon activation, thereby sending a sensory, but not audible at a significant distance (10 feet, for example), notice to the wearer of the apparatus 10. The compact vibration button motor 26 is included to notify the user regarding aspects of the apparatus 10 without notifying those around him or her. Thus, when the computer calculates that the amount of time since the cartridge 24 was replaced exceeds the recommended time, the motor 26 may be actuated. The computer is preferably connected to a screen where a corresponding visual notice may be displayed, such as by text or images, on the apparatus 10. Alternatively, the computer may be connected via wireless or wired connection to a smartphone or other computer where the visual notice may be displayed.

It is contemplated that artificial intelligence (AI) may be incorporated into the software of the apparatus 10 in order to provide some of the functionality that AI is known for. The specific application of AI in the apparatus 10 may be to constantly or periodically assess threat level for the user for the geographic area he or she is in or is travelling toward, such as by analyzing police data, data in mapping software, news, etc. In one embodiment, AI may operate in the background to alert the wearer of any threat assessment survey of a known crime area or active crime in a nearby area. This may be especially helpful if the wearer is traveling to unknown locations for business, vacation or new residence, both in the US and in other countries. Alerts may be sent to the wearer regarding where police, fire/rescue and hospitals are located for safely taking cover in unfamiliar areas. These could include 24 hour businesses that can serve as shelters or safe havens in the targeted zones to which the wearer may be travelling. Having alerts such as these aids greatly in the wearer's safety, heightens the wearer's awareness, and could alter a planned path for a safer route to a desired location. In one embodiment, the apparatus 10 may be automatically raised from normal to armed status by the alert or another function of the software.

FIG. 2 is a top view of the internal components of the apparatus 10 once the housing 14 is removed from the main body 16. As discussed herein, the main body 16 supports the micro-solenoid 20 to press against the lever 22, which displaces the pressurized gas cartridge 24 toward, and possibly against, the orifice 25 in the main body 16, thereby forcing the gas in the cartridge 24 to discharge. The button 18 is another example of an actuator, and it is preferably spring-loaded and biased away from the cartridge 24 to prevent the discharge of gas until discharge is desired. By depressing the button 18, the cartridge 24 is displaced to the orifice 25.

Figure 3:
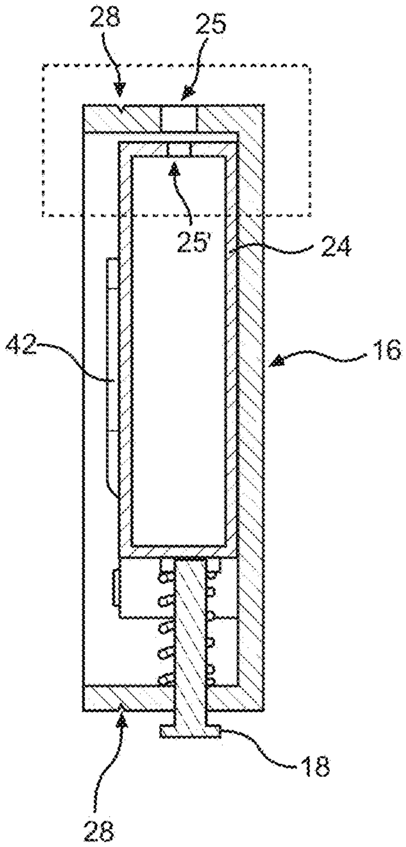
FIG. 3 is a view in section taken through the line 3-3 of FIG. 2 illustrating the self-defense device of the present invention.
Figure 3B:
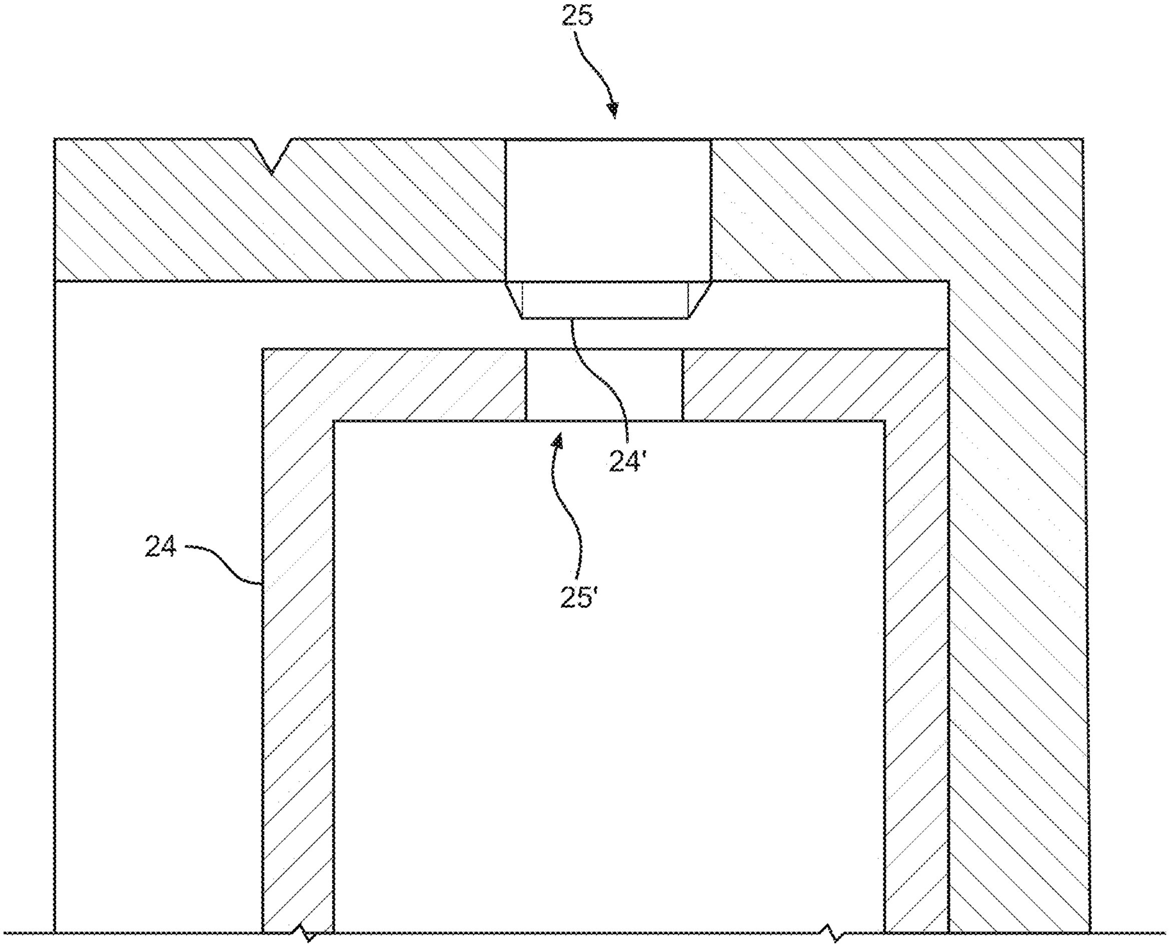
FIG. 3B is a magnified view of the encircled portion of FIG. 3.
Figure 6:
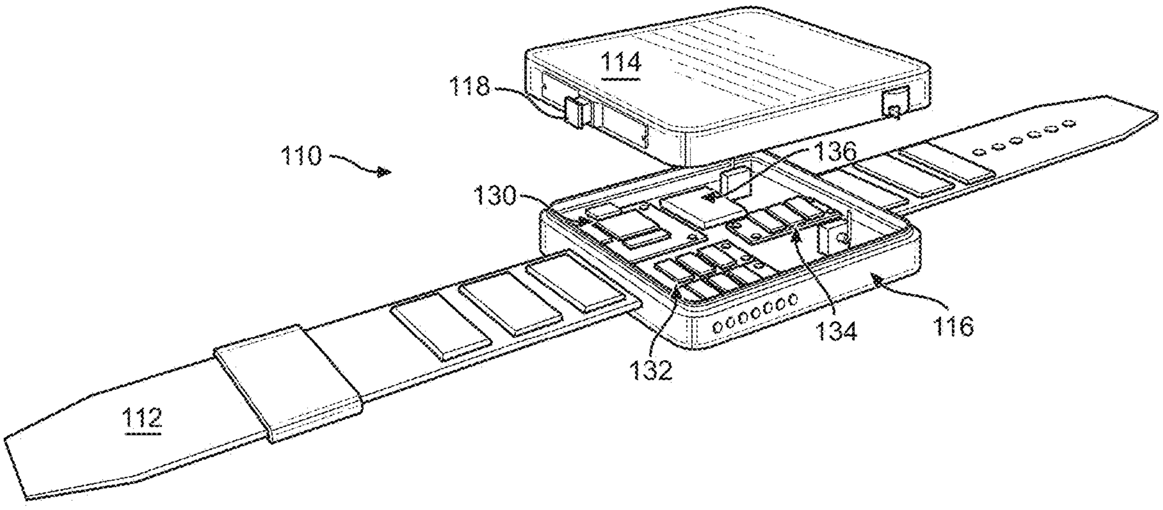
FIG. 6 is an exploded view in upper perspective illustrating an alternative embodiment of the present invention.

FIG. 3 shows a side view of the self-defense apparatus 10 of the present invention, including the main body 16, the pressurized gas reservoir 24, and the button 18. As shown, the main body 16 includes an orifice 25 that extends along the plane that contains the main body 16, but may be angled away from the user's wrist (at up to about a 30-40 degree angle) to maximize the probability that the pepper spray sprays past the user's body. The localized frangible insert structure 25' in the gas cartridge 24 contacts a structure on the inside of the main body 16, such as the object 24' shown in FIG. 3B, to break the frangible structure 25' and release the pressurized gas through the spray nozzle at the orifice 25.

Figure 4:
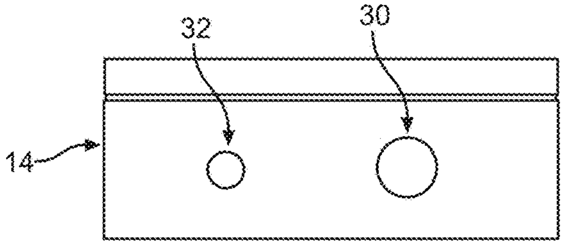
FIG. 4 is a side view illustrating the end wall of the self-defense device of the present invention.

FIG. 4 is a side view showing the end wall of the self-defense device of the present invention including an orifice 30 for the shaft of the button 18 to extend through and a second orifice 32 for light or sound transmission into or out of the housing 14, such as for an LED or a microphone/ speaker. The orientation of the components covered by the housing 14 may be moved so that a person may orient the button 18 and the orifice 25 on more preferred sides of the housing 14. This permits a left-handed person to rotate the components 180 degrees from the orientation for a right-handed person. Furthermore, someone who has a missing limb may wish to orient the button 18 and orifice 25 in yet another configuration. This may be accomplished by moving the strap 12, or by a mechanism to permit rotation of the main body 16 and housing 14, along with all components, relative to the strap 12.

Figure 5:
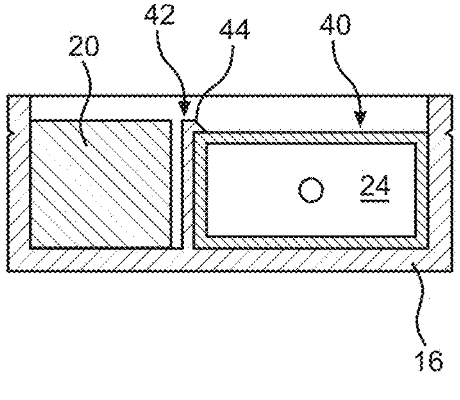
FIG. 5 is a view in section taken through the line 5-5 of FIG. 2 illustrating the self-defense device of the present invention.

FIG. 5 is a side view in section of the internals of the self-defense apparatus 10 showing the replaceable gas cartridge 24 that is "snapped" into a cavity 40 within the main body 16. The cavity 40 is defined on one side by a flexible lip 42 that has a barb 44 that retains the cartridge 24 in the cavity 40 under most circumstances. The cartridge is thus slidably engaged within the main body 16 and can move longitudinally to engage the spray orifice 25 and deploy the pressurized fluid in the cartridge. The cartridge 24 is also removable by flexing the flexible lip 42 away from the cartridge 24 until the barb 44 is far enough away from the cartridge 24 that the cartridge 24 may be removed from the main body 16. It is preferred that the cartridges may be readily replaced when displacing the lip 42 away from the cartridge 24 and manually removing the cartridge 24. Furthermore, water (or other innocuous liquid) cartridges compatible with the apparatus 10 are available for aiming practice without fear of a reaction to pepper spray.

The operation of the apparatus 10 is as follows. The user wears the apparatus 10 in the manner of a smart watch inasmuch as the user extends the strap 12 around his or her wrist or other limb. There are very few devices for amputees, and this invention provides one where no other exists. The user may place the strap around the wrist, arm or leg (depending on disability) and proceed with his or her day. There may be replaceable straps to various parts of the body for persons with amputated limbs that may replace the strap 12 shown in FIGS. 1A and 1B. These include, without limitation, an elastic/Lycra arm sleeve, arm band or leg sleeve. The main body 16 and the housing 14 are preferably located on the side of the arm or limb that faces away from the body when the user's arms are at his or her sides in a resting position. This points the orifice 25 downwardly, or substantially in a downward direction, and the button 18 upwardly toward the user's eyes. The apparatus 10 is thus adjacent the hand of the user, and therefore is always ready to be used.

The apparatus 10 is activated by either manually pressing the button 18 or by activation of the micro-solenoid 20, as explained in more detail herein, by a computer or other component. When the apparatus 10 is activated, the cartridge 24 is displaced toward the orifice 25, and the contents of the cartridge are ejected rapidly and at high pressure out of the orifice 25. At this time, the user will preferably be aiming the orifice 25 at the assailant, which will cause the pepper spray to spray in the assailant's direction. Even with an indirect strike by the pepper spray, the assailant will be on notice that the wearer has engaged in defensive tactics, and may have others prepared. The communications (e.g., text messages, geolocation, etc.) will also be sent out as described herein, thereby notifying others that the wearer has been attacked and the location where the attack occurred. Preferably 911 is also notified, along with the location information.

Figure 9:
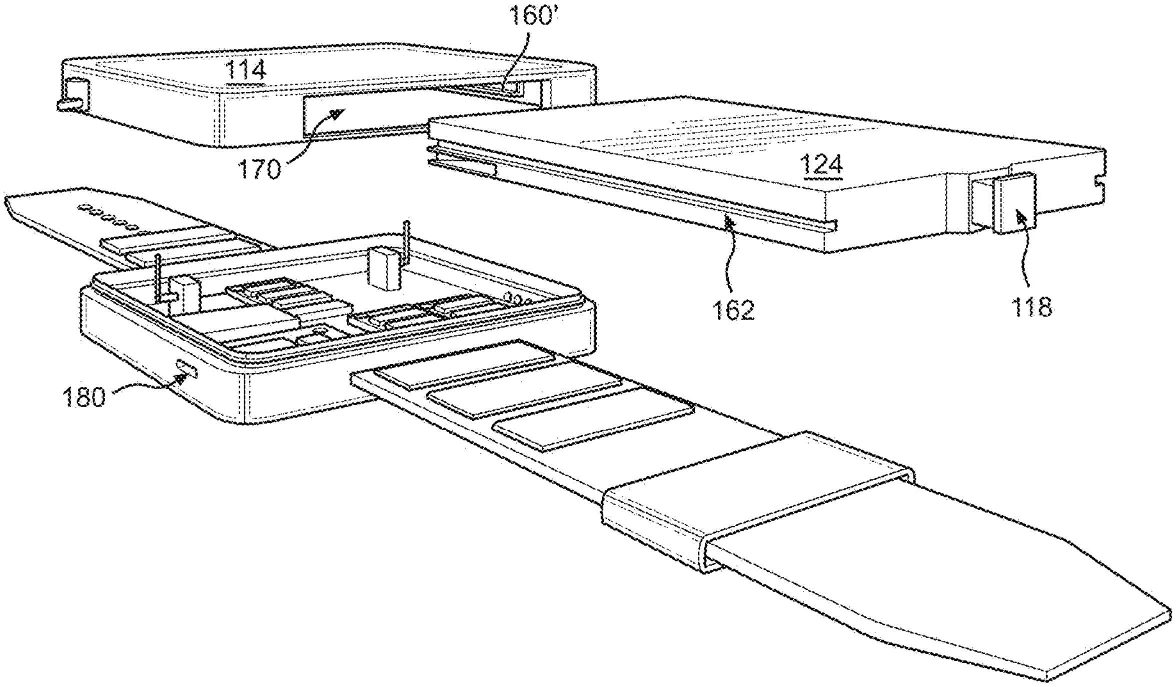
FIG. 9 is an exploded view in end perspective illustrating the embodiment of FIG. 6.

An alternative embodiment is shown in FIGS. 6-9. The apparatus 110 has a main body 116 with an attached strap 112 to enable wearing of the apparatus 110 in the manner of a watch or fastened around a limb other than the arm. A housing 114 attaches to the main body 116 and a button 118 protrudes from one side thereof. A battery, accelerometer, computer and/or wireless communication device (e.g., a radio) are represented by the reference numerals 130, 132, 134, and 136. The charging port 180 is shown in FIG. 9 to permit charging of the battery.

Figure 7:
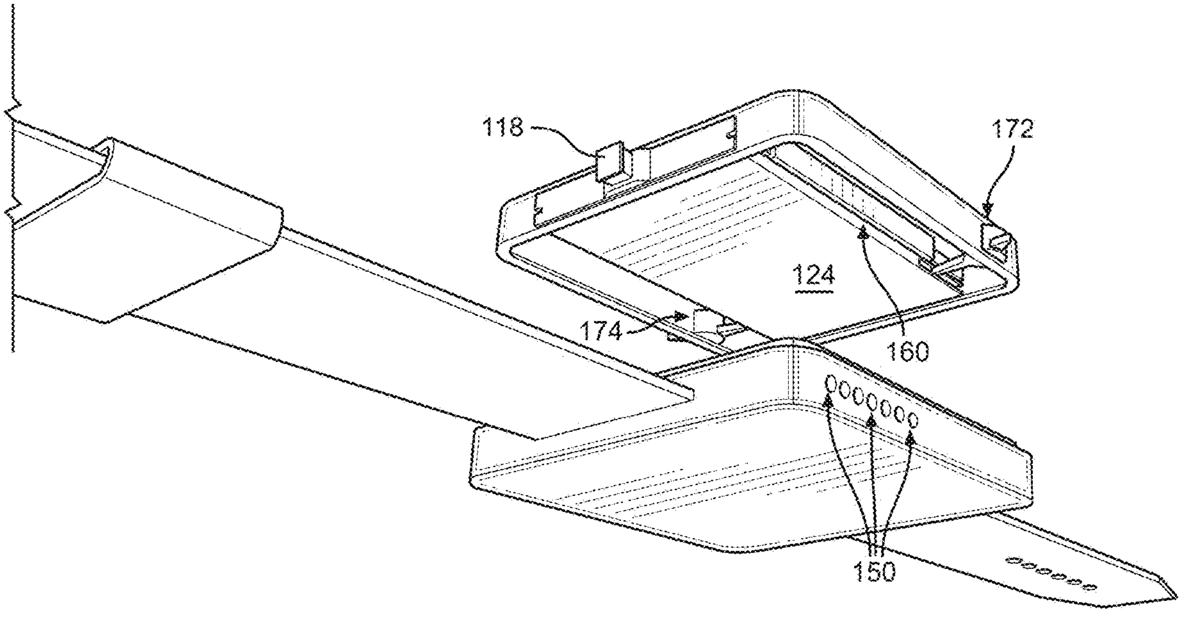
FIG. 7 is an exploded view in lower perspective illustrating the embodiment of FIG. 6.
Figure 8:
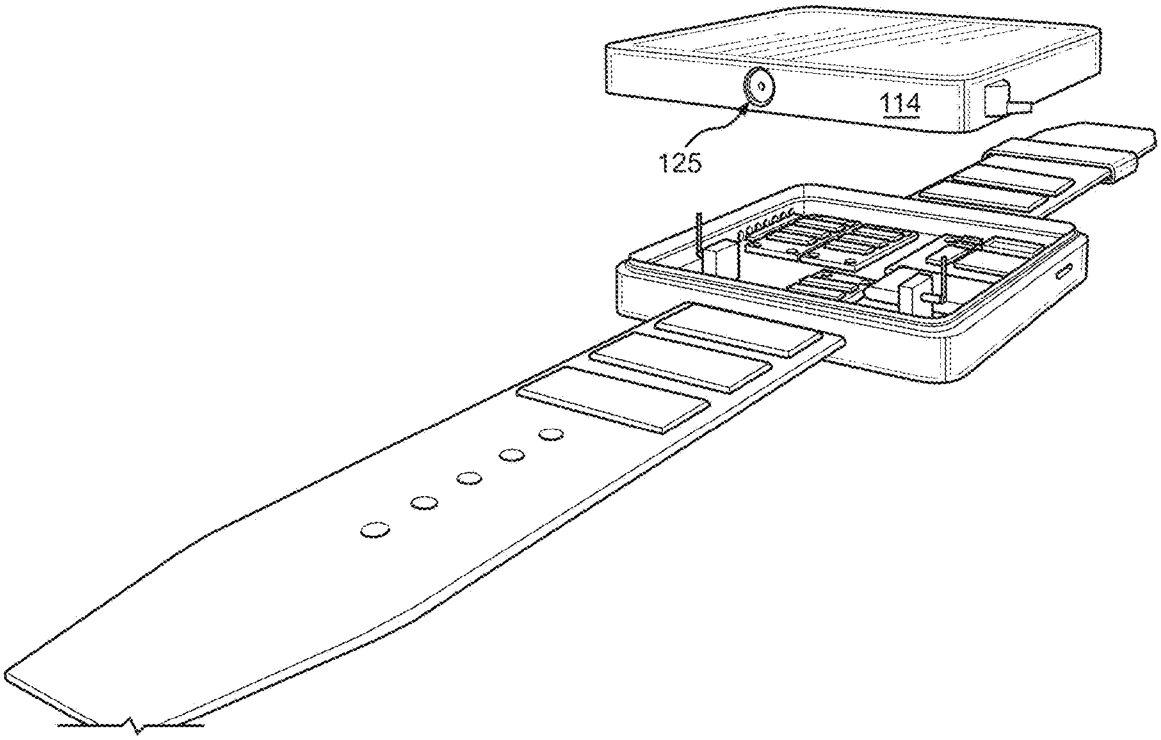
FIG. 8 is an exploded view in upper perspective illustrating the embodiment of FIG. 6.

As shown in FIGS. 7 and 9, a cartridge 124 containing pressurized pepper spray may be inserted through an opening 170 in the housing 114. The lateral slots 160 and 162 in the cartridge 124 receive rails 160' and another identical rail on the opposite side of the housing as the rail 160'. Thus, the cartridge 124 may be readily inserted and removed from the housing 114, without removing the housing 114, making reloading of cartridges very rapid, similar in timing necessary to reload the magazine of an automatic weapon. This gives the wearer a backup in case the previous times of spraying the pepper spray were not fully effective to halt the assault.

Because the button 118 is integrated into the cartridge 124, as shown in FIG. 9, upon activation of the cartridge 124 by either pressing the button 118 or by a computer displacing the cartridge 124, the cartridge 124 may be readily removed by pulling on the button 118. Then an entirely new cartridge with another button is placed in the apparatus 110. Rotation of the button 118 may be necessary when removal is desired to reverse a "bayonet" type fitting (not shown) or similar that ensures the cartridge 118 is fully engaged in the apparatus 110. In some embodiments, the button 118 may be pushed after the computer activates the spraying of pepper spray to halt the spraying in the case of a false alarm.

Latches/clamps 172 and 174 are part of a mechanism that may lock the cartridge 124 in place when installed, and may be used to eject the cartridge 124 after it has been emptied or its useful life has expired. Alternatively, the latches/clamps may be integrated into a solenoid or other prime mover to displace the cartridge 124 to eject the pepper spray. Orifices 150 permit air and other gases to pass through the housing 114 for cooling, along with sound if a speaker is part of the apparatus 110. The cartridge 124 moves to one side along the slots 160 and 162 by the button 118 being pushed to eject the pepper spray or other fluid in the cartridge 124 through the orifice 125.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A personal defense device comprising:

(a) a main body to which a cartridge is removably mounted, the cartridge containing contents that repel humans and/or animals;

(b) a strap mounted to the main body and configured for attachment to a human limb;

(c) a housing removably mounted to the main body and extending over the cartridge; and (d) at least one actuator having at least one component drivingly linked to the cartridge for displacing the cartridge to contact a structure and eject at least some of the contents through a discharge orifice formed through at least one of the main body and the housing, wherein the at least one actuator is a manual button drivingly linked to the cartridge and configured to displace the cartridge upon displacement of the button.

2. The personal defense device in accordance with claim 1, further comprising:

(a) a second actuator including:

(i) a microphone;

(ii) a computer connected to the microphone and programmed to recognize at least one pre-programmed set of vocal patterns and produce a signal; and (iii) a prime mover connected to the computer and drivingly linked to the cartridge and configured to displace the cartridge upon receipt of the signal from the computer.

3. The personal defense device in accordance with claim 1, further comprising:

(a) a second actuator including:

(i) an accelerometer;

(ii) a computer connected to the accelerometer and programmed to recognize at least one preprogrammed set of movements and produce a signal; and (iii) a prime mover connected to the computer and drivingly linked to the cartridge and configured to displace the cartridge upon receipt of the signal from the computer.

4. The personal defense device in accordance with claim 1, further comprising:

(a) a second actuator including:

(i) a microphone;

(ii) a computer connected to the microphone and programmed to recognize at least one pre-programmed set of vocal patterns and produce a signal; and (iii) a prime mover connected to the computer and drivingly linked to the cartridge and configured to displace the cartridge upon receipt of the signal from the computer; and (b) a third actuator including:

(i) an accelerometer;

(ii) a computer connected to the accelerometer and programmed to recognize at least one preprogrammed set of movements and produce a signal; and (iii) a prime mover connected to the computer and drivingly linked to the cartridge and configured to displace the cartridge upon receipt of the signal from the computer.

5. The personal defense device in accordance with claim 4, wherein the computer provides at least one data function, selected from the group consisting of: time stamping, geolocation, emergency texting, cell service, web access and Bluetooth compatibility.

6. The personal defense device in accordance with claim 1, wherein the discharge orifice includes a spray nozzle.

7. A personal defense device comprising:

(a) a main body;

(b) a strap mounted to the main body and configured for attachment to a human limb;

(c) a housing mounted to the main body;

(d) a cartridge removably mounted within the housing and containing contents that repel humans and/or animals, wherein the housing defines an opening through which the cartridge may pass for inserting the cartridge into the housing and for removing the cartridge from the housing without separating the housing from the main body; and (e) at least one actuator having at least one component drivingly linked to the cartridge for displacing the cartridge to contact a structure and eject at least some of the contents through a discharge orifice formed through at least one of the main body and the housing, wherein the at least one actuator is a manual button drivingly linked to the cartridge and configured to displace the cartridge upon displacement of the button.

8. The personal defense device in accordance with claim 7, wherein the manual button is integrated into the cartridge.

9. The personal defense device in accordance with claim 7, further comprising:

(a) a microphone;

(b) a computer connected to the microphone and programmed to recognize at least one pre-programmed set of vocal patterns and produce a signal; and (c) a prime mover connected to the computer and drivingly linked to the cartridge and configured to displace the cartridge upon receipt of the signal from the computer.

10. The personal defense device in accordance with claim 7, further comprising:

(a) an accelerometer;

(b) a computer connected to the accelerometer and programmed to recognize at least one preprogrammed set of movements and produce a signal; and (c) a prime mover connected to the computer and drivingly linked to the cartridge and configured to displace the cartridge upon receipt of the signal from the computer.

11. The personal defense device in accordance with claim 7, further comprising:

(a) a second actuator including:

(i) a microphone;

(ii) a computer connected to the microphone and programmed to recognize at least one pre-programmed set of vocal patterns and produce a signal; and (iii) a prime mover connected to the computer and drivingly linked to the cartridge and configured to displace the cartridge upon receipt of the signal from the computer; and (b) a third actuator including:

(i) an accelerometer;

(ii) a computer connected to the accelerometer and programmed to recognize at least one preprogrammed set of movements and produce a signal; and (iii) a prime mover connected to the computer and drivingly linked to the cartridge and configured to displace the cartridge upon receipt of the signal from the computer.

12. A method of personal defense comprising:

(a) attaching an apparatus to a human limb, the apparatus comprising:

(i) a main body to which a cartridge is removably mounted, the cartridge containing contents that repel humans and/or animals;

(ii) a strap mounted to the main body and extending around the limb;

(iii) a housing removably mounted to the main body and extending over the cartridge; and (iv) a manual button drivingly linked to the cartridge; and (b) displacing the manual button and thereby displacing the cartridge to contact a structure and eject at least some of the contents through a discharge orifice formed through at least one of the main body and the housing.

13. The method in accordance with claim 12, further comprising removing the cartridge from the housing through a slot in the housing after at least some of the contents are ejected.

* * * * *